April 28, 1936.　　L. R. TALLMAN ET AL　　2,038,809

COMBINE BALER

Filed Nov. 9, 1934　　5 Sheets-Sheet 1

INVENTORS.
Leslie R. Tallman
Gentry S. Tallman
BY
Zefft & Zefft
ATTYS.

April 28, 1936.　　　L. R. TALLMAN ET AL　　　2,038,809
COMBINE BALER
Filed Nov. 9, 1934　　　5 Sheets-Sheet 3

April 28, 1936.  L. R. TALLMAN ET AL  2,038,809
COMBINE BALER
Filed Nov. 9, 1934    5 Sheets-Sheet 5

Patented Apr. 28, 1936

2,038,809

UNITED STATES PATENT OFFICE 2,038,809

COMBINE BALER

Leslie R. Tallman and Gentry L. Tallman,
Shelbyville, Ill.

Application November 9, 1934, Serial No. 752,194

20 Claims. (Cl. 56—364)

This invention relates to combine balers, particularly to a baler combined with a novel pick-up and feeding mechanism.

An object of the invention is to provide a baling mechanism having an associated feeding mechanism both supported upon a common supporting carriage.

Another object is to provide a baler mechanism combined with a pick-up and feeding mechanism, both being driven by means of power taken from a tractor used for moving the apparatus over the field.

A further object is to provide a baler mechanism combined with a pick-up and feeding mechanism, the latter being driven by power derived from a tractor used for moving the apparatus over the field, the feeding mechanism having novel means for gathering material from the ground and discharging the same into the baler.

An additional object lies in the provision of a feeding device as aforesaid having novel means for feeding gathered material into the baler in a controlled manner.

Still another object is to provide a feeding device as aforesaid having novel means for continuously gathering material from the ground and intermittently feeding the same into the baler.

A further object is to provide a feeding device as aforesaid comprising pick-up and feeding mechanisms, one adapted to continuously gather material from the ground and feed the same into the associated mechanism, the second named mechanism adapted to receive the materials and transport the same into the baler, the latter mechanism adapted to be controlled independently of the first named mechanism whereby material may be continuously gathered from the field and intermittently fed into the baler.

Another object is to provide an apparatus of the class described having novel means for gathering materials from a field and transporting the same into a baler with minimum agitation and degradation of the material.

Another object resides in the provision of mechanism adapted to gather materials from the ground, the same having means for following the contour of the ground with fidelity comprising ground wheels which support a portion of the weight of the gathering mechanism and hold it properly spaced from the ground and means for adjusting the weight supported upon the ground wheels.

A further object is to provide a gathering mechanism having means for properly spacing it from the ground, the same comprising ground wheels which support a portion of the weight of the mechanism on the ground and which are adapted to follow the contour thereof with fidelity and means for adjusting the weight supported by the ground wheels in accordance with conditions of contour and consistency of the soil to be traversed.

Other objects will appear in the following description and accompanying drawings in which:

Fig. 2 is a perspective view showing details of a control mechanism to be referred to;

Fig. 4 is a fractional elevational view showing detail of a portion of the feeding mechanism to be described;

Figure 1:
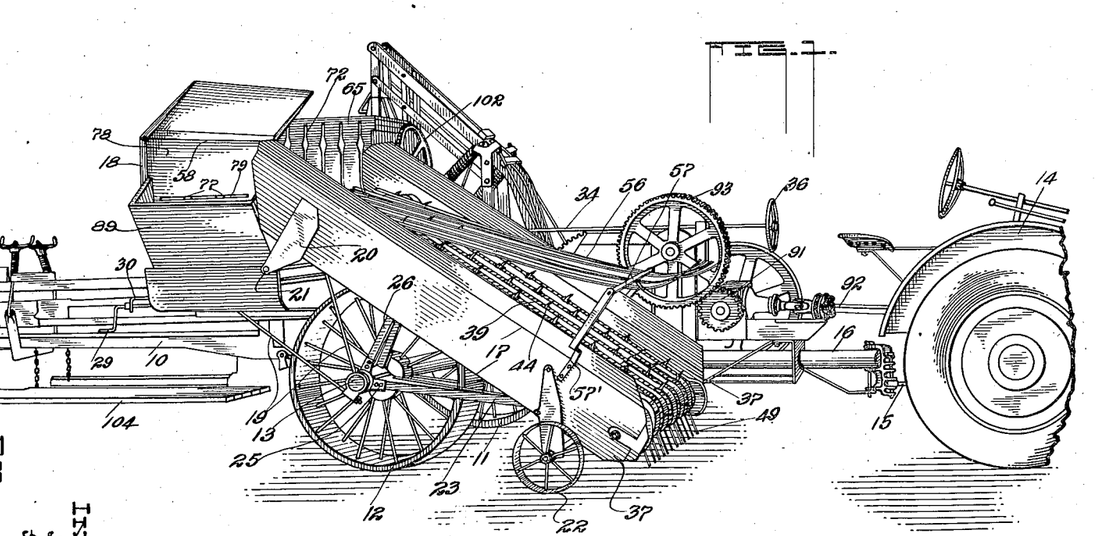
Fig. 1 is a perspective view of the device viewed from the right hand side.
Figure 2:
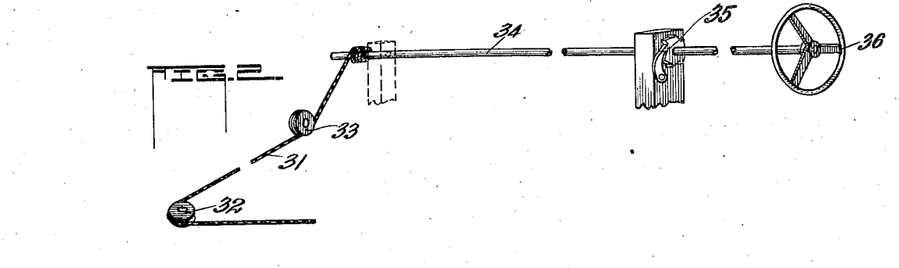

Referring to Figs. 1 and 2, our invention generally comprises a baling mechanism 10, a major part of the weight of which is supported upon the axle 13 of plural ground wheels 11 and 12, an additional means of support being afforded by a tractor 14 through the conventional hitch mechanism 15 connected by a draw bar 16 secured to the baler.

Fig. 1 illustrates a feeding mechanism disposed alongside the baler and comprising an inclined pick-up unit designated 17 and co-operative cross conveyor feed unit 18.

Figures 7, 8, 9, 10, 11:
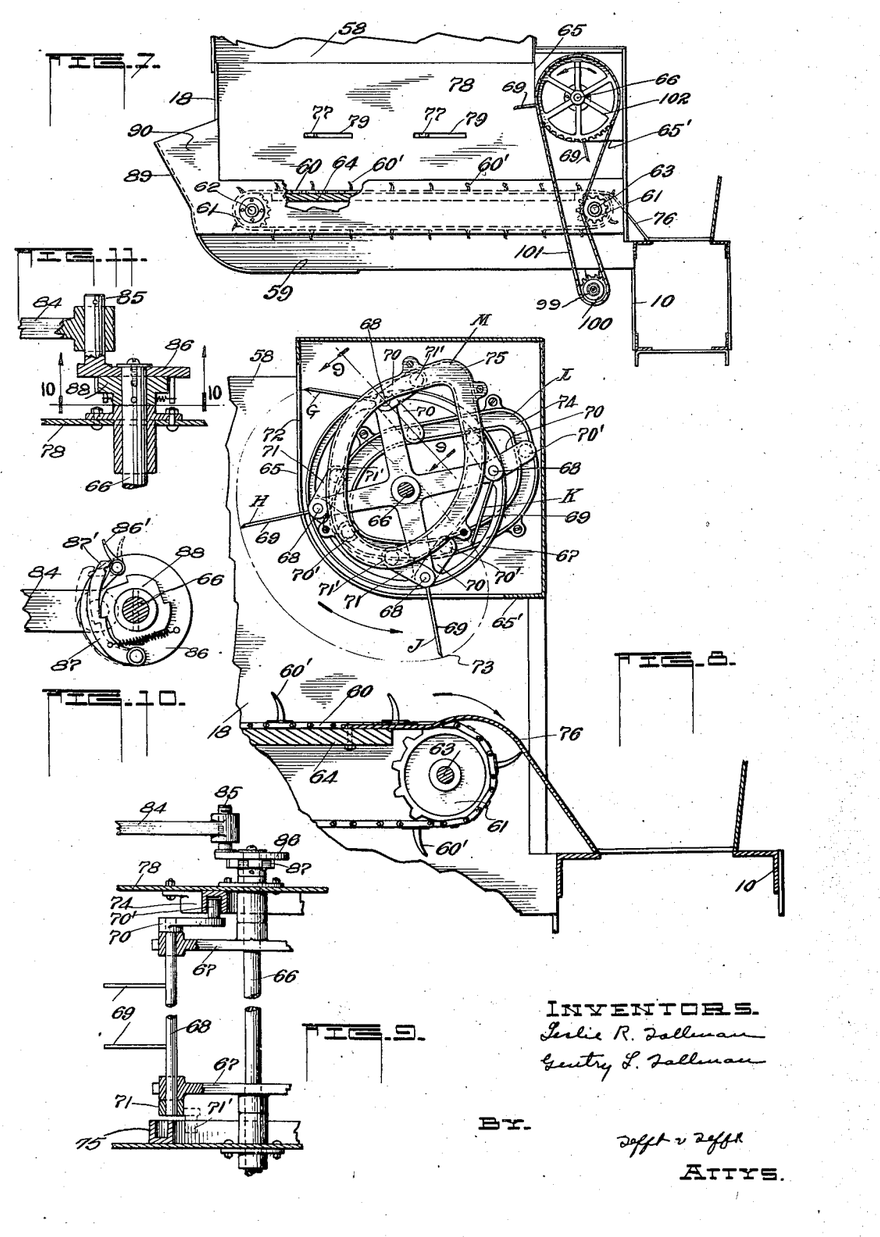
Fig. 7 is a sectional elevational view taken approximately on line 7—7 in Fig. 5.
Fig. 8 is a sectional elevational view taken on line 8—8 of Fig. 5, the same showing details of mechanism to be described.
Fig. 9 is a sectional plan view showing details of mechanism to be explained, the same being taken from line 9—9 in Fig. 8.
Fig. 10 is a detail sectional view taken on line 10—10 of Fig. 11.
Fig. 11 is a detail sectional view through a portion of the mechanism shown in Fig. 9.

The cross feed unit is supported at its inner end upon the frame of the baler in the relation shown in Fig. 7, it being secured by any suitable means, and at its outer end by means of brace 19 supported upon an extending end of axle 13.

The pick-up unit is supported at its upper end by means of brackets 20 secured to the pick-up structure and pivotally attached at 21 to the cross feed structure. The lower end of the pick-up is supported in part by relatively small ground wheels 22 and the proportion of weight borne by these is made adjustable by means of a mechanism shown best in Fig. 6, in which is shown a forwardly extending arm 23 having its outer end connected with the frame structure by a movable link 24 and its inner end connected to an arm of a hub structure 25. Hub 25 is pivotally supported upon the extending end of axle 13 and has an arm 26 extending upwardly as shown.

To the outer end of arm 26 is connected a rod 27 attached to a spring 28, the opposite end of which is attached to an adjustment screw 28' including a hand crank 29.

Screw 28 is mounted in a bracket 30 attached to the cross feed structure and is obviously adapted to adjust the tension exerted upon arm 26 by the spring 28.

Spring 28, operating through arms 26 and 23, is sufficiently powerful to counterbalance the weight of the overhung portion of the pick-up structure, when so adjusted by the screw. It is preferably adjusted to counterbalance a substantial portion of the weight leaving only sufficient weight upon wheels 22 to insure their contact with the ground and proper alignment of the pick-up elements with the contour thereof.

Figure 6:
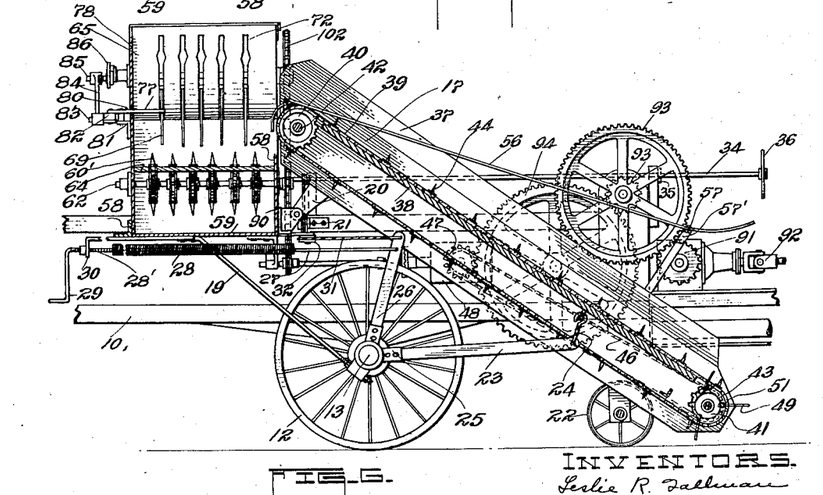
Fig. 6 is a fragmentary side elevational view with certain parts shown in section to permit clearer view of parts to be described. This view would be taken from the lower side of Fig. 5.

In order that the pick-up structure may be raised clear of the ground, as when transporting the apparatus to and from a field, we provide a mechanism including a cable 31 attached to arm 26, reefed about pulleys 32 and 33, see Figs. 2 and 6, and wound about a shaft 34 which is rotatably supported upon the baler frame structure and is provided with a ratchet and pawl mechanism 35 and a hand wheel 36 conveniently disposed for use by the operator of the tractor.

It will be apparent that rotation of the hand wheel causes cable 31 to wind upon shaft 34 to operate through arms 26 and 23 to lift the forward end of the pick-up unit and that ratchet 35 is adapted to hold the same in any adjusted position.

Figure 5:
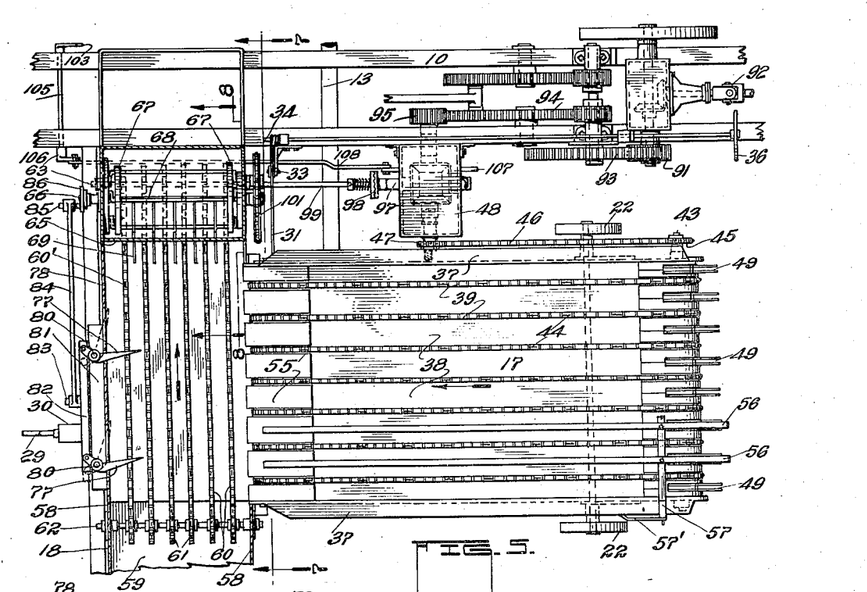
Fig. 5 is a fragmentary plan view of the device.

Figs. 1, 5, and 6 illustrate the pick-up unit as comprising connected side frame members 37 between which is disposed a floor member 38.

Supported to slide upon floor 38 is a plurality of chains 39 which operate over upper and lower sprockets 40 and 41 secured upon upper and lower shafts 42 and 43 which latter are supported in bearings in the frame structure.

The chains, travelling in the direction of the arrow in Fig. 5, are provided with upstanding pin sections 44 adapted to engage material gathered from the ground and propel the same along floor 38 to discharge into the cross conveyor feed unit. The pins are curved backwardly as shown for a purpose which will be explained. Power to drive the chain assembly is transmitted through a sprocket 45, secured to shaft 43, and chain 46 meshing with a sprocket 47 driven from a control unit 48 which will be referred to later.

Our invention includes a novel mechanism for picking up hay or other material from the ground and placing it in engagement with the aforementioned chain pins 44 to be transported as described.

Figure 12:
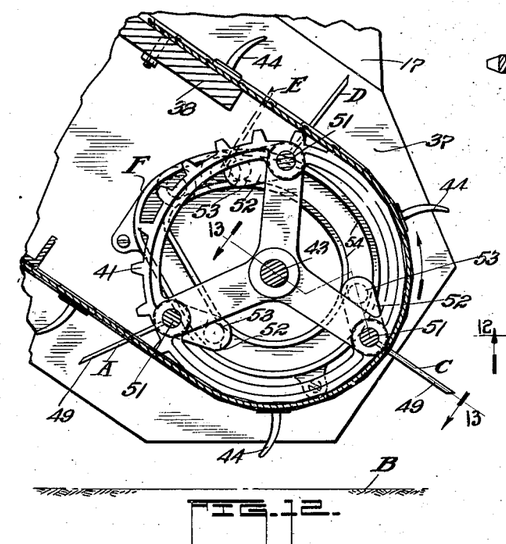
Fig. 12 is a sectional elevational view taken at line 12—12 in Fig. 13.
Figure 13:
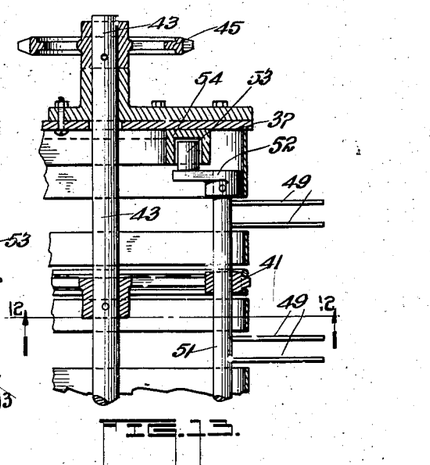
Fig. 13 is a detail sectional view taken approximately on line 13—13 in Fig. 12.

The mechanism comprises a plurality of pins or tines 49, shown in Fig. 5 as disposed between chains 39 and in detail in Figs. 12 and 13.

The latter views show sprockets 41 provided with bearings in which are carried shafts 51 extending across the pick-up unit. Tines 49 are secured upon shafts 51 and are preferably made from flexible material or are otherwise made resiliently movable with respect to shafts 51.

On opposite ends of shafts 51 are secured arm members 52 carrying rollers 53 which are engaged in stationary cams 54 secured to the side frame members 37.

Cams 54 are so fashioned, and arms 52 are so disposed with respect to tines 49, that when sprockets 41 are rotated the tines are so positioned with respect to the sprockets as to be particularly efficient in picking up hay from the ground, placing it in engagement with the transport chains and withdrawing from the hay in a manner to cause a minimum of distortion of the hay fibers.

Fig. 12 best illustrates the action. With the sprockets rotating in the direction of the arrow, at the point A, cam 54 is formed to position the tine on a substantially radial line whereby it is made most effective to rake and elevate hay from the ground B upwardly through positions C and D to place it where it is effectively engaged by pins 44.

As the tines and their associated arms progress toward the point D, cam 54 is formed to lead the arms outwardly which results in rotation of shafts 51 in a negative direction during its forward progress from D to E which gives the effect, with respect to the hay, of withdrawing the tine in a longitudinal manner.

The hay, having been placed in engagement with pins 44, is propelled thereby upwardly toward the cross feed unit, while the sprockets and shafts 51 continue a circular course to propel rollers 53 into a somewhat sharply lobed portion F of the cam whereby shaft 51 is rotated forwardly in an accelerated manner to restore the tines to the radial position A in position to begin another cycle.

The hay having been placed in engagement with pins 44 is transported upwardly, sliding upon floor 38 in a substantially quiescent state, to be discharged into the cross feed conveyor.

In order that the hay may be disengaged from pins 44 and discharged into the cross feed with a minimum of agitation we provide a novel mechanism as shown in detail in Fig. 4.

At the upper end of floor 38, and forming a continuation of the surface thereof, are secured stripper members 55 fashioned upon an arcuate line eccentric with shaft 42 substantially as shown.

It has already been noted that pins 44 are curved backwardly and the angle of this curve is made such that during movement of the pins about sprockets 40 the stripper members co-operate with the pins to remove the hay therefrom in a non-agitative and non-distorting manner. It is thought the illustration in Fig. 4 indicates the operation in a clear manner.

In order that the hay may not be disturbed by wind while being transported by the conveyor we provide a plurality of strips 56, best shown in Figs. 5 and 6. The strips are preferably made from flexible material or mounted in a resilient manner upon a cross rail 57 and spaced apart so as to align between chains 39. The cross rail is supported upon uprights 57' which are secured to side frame members 37. The upper ends of the strips rest upon the upper portion of the floor 38 in the manner shown. Obviously hay being transported is carried beneath the strips whereby the strips rest upon it in a resilient manner, thus forming a cage-like retaining means and exerting sufficient pressure upon the hay to provide more positive engagement thereof with pins 44.

The cross feed conveyor is best shown in Figs. 5, 6, and 7, as comprising a frame structure including side members 58 and bottom member 59. A conveyor unit, similar in construction to the pick-up conveyor formerly described, has chains 60 carried by sprockets 61 secured upon shafts 62 and 63 supported in bearings disposed at opposite ends of the frame structure. The chains carry pins 60' similar in form to pins 44. A floor member 64 is disposed below the chains in position to provide a sliding surface therefor.

The frame structure is supported at its inner end upon the frame structure of the baler and at its outer end by means of braces 19 which latter are supported by axle 13.

As shown in Fig. 7, the shaft 63 is disposed above and at one side adjacent the baler frame 10 in such position that hay transported by the conveyor will be discharged into the baler.

In order that the hay will be discharged into the baler in a stream having a form best suited to be operated on thereby, which is preferably slightly compact, we arrange that it shall be discharged through a throated opening and this opening is provided by means of a deflector plate 65 best shown in Figs. 6 and 7.

Plate 65 is fashioned upon a line which is vertical at the left in Fig. 7 and is curved downwardly and toward the right to terminate in a horizontal tangential portion designated 65'. It will be apparent that hay being transported toward the baler will be projected through the opening between the conveyor floor 64 and the tangential portion 65' of plate 65.

Assuming that the stream of hay being transported has, in its loose state, a cross sectional area considerably greater than that of the throat noted, it would obviously be necessary to provide means for compressing it to pass through the throat. This action is accomplished by the forward curved portion of plate 65. However, under conditions of practical use the traction afforded by chain pins 60' would not be sufficient to properly move the hay in an undisturbed stream through the throat against the resistance presented by the compression action at plate 65.

In order to conduct the hay through the throat in a smooth continuous manner we provide a special forking mechanism comprising a shaft 66 disposed rearwardly of plate 65 and journalled in bearings secured to an upper part of the frame structure.

Shaft 66 carries wheel members 67 in the spokes of which are journalled a plurality of longitudinal shafts 68. Each of shafts 68 carries a plurality of tines 69 similar to tines 49 already described.

At opposite ends of shafts 68 are secured arms 70 and 71, see Fig. 9, and these are positioned at an offset angle as indicated in Fig. 8. Tines 69 are directed outwardly from arms 70 and 71 at an angle approximately intermediate thereof. Slots 72 are provided in plate 65, as shown in Fig. 6, to permit projection of tines 69 beyond the surface of the plate.

Arrows in Fig. 8 show the direction of movement of hay through the throat.

The broken line 73 indicates the path of movement of the points of tines 69, which movement is produced by cooperation of dissimilar stationary cams 74 and 75 which are secured to the frame structure opposite arms 70 and 71 respectively and engage rollers 70' and 71' whereby during rotation of shaft 66, the rollers alternately lead or are led to follow the conformity of the cams in such a manner as to move shafts 68 through various angles of rotation.

The configuration of cam 74 is made to co-operate with that of cam 75, their relative forms being such that arms 70 and 71, moving as a unit with shaft 68, are at some points under control of cam 74, and at other points under control of cam 75.

Fig. 8 illustrates the action. Starting at point G the tine is shown in approximately horizontal position with shaft 68 leading rollers 70' and 71' in substantially parallel paths. Continued rotation of shaft 66 brings about movement of the tines toward point H with rollers 70' and 71' following dissimilar paths so fashioned as to move the tines into a radially directed position with respect to shaft 66 which relation is maintained during movement to point J. Substantially at the latter point the paths of the cams diverge in such a manner as to bring about rotation of shaft 68 to position the tines as shown at point K. During movement of the tines from position J to K they are maintained in substantially vertical position by reason of which they are withdrawn upwardly out of the hay stream without disturbance of the fibers.

Continued rotation of shaft 66 brings about movement of roller 70' into lobe L of cam 74 where the movement of the roller is momentarily retarded while at the same time roller 71' is moved into lobe M of cam 75 where the roller 71' is likewise momentarily retarded. During the latter described movement shaft 68 has assumed a position to lead roller 70' from lobe L and continued movement of the shaft eventually leads roller 71' from lobe M to place the parts in G position. During movement of rollers 70' and 71' over lobes L and M, shaft 68 has been rotated in a reverse direction to cause the point of the tines to substantially follow the line 73.

In view of the foregoing it is thought apparent that a hay stream moving toward contact with plate 65 will be engaged by downwardly and forwardly moving tines which firmly fork into the hay to force it to follow the contour of plate 65 and to co-operate with pins 60' to conduct it through the throat toward discharge into the baler. It is further thought apparent that the functions described are accomplished with a minimum of distortion and disturbance of the individual fibers of the hay.

It is to be noted that pins 60' are curved backwardly in a manner similar to pins 44 and that the discharge end of floor 64 is provided with eccentrically disposed stripper members 76 similar to strippers 55.

Obviously the strippers 76 are effective to remove the hay from engagement with the pins and this action takes place simultaneously with withdrawal of tines 69.

It will be apparent that the hay stream entering the cross feed conveyor from the pick-up conveyor must have its direction of travel abruptly diverted toward the discharge throat and baler. To facilitate this diversion we provide an additional forking mechanism disposed so as to engage the incoming stream and direct it toward the throat.

Figs. 5, 6, 7, 9, 10, and 11 illustrate the mechanism as comprising a pair of pointed arms 77 adapted to be projected inwardly of the back board 78 through slots 79.

Arms 77 are pivotally mounted at 80, to rock in a horizontal plane, upon a block member 81 which is slidably supported on back board 78. A second longitudinally movable block member 82 is pivotally connected with rearwardly extending portions of arms 77. Block 82 is obviously movable with respect to block 81 to an extent permitted by arcing movement of the extensions of arms 77.

Block 82 carries a stud 83 and upon this is pivoted a connecting rod 84 which has its opposite end connected to a stud 85 eccentrically disposed on a disk 86 which is rotatably confined upon the end of shaft 66 as shown in Fig. 11.

Disk 86 carries a pawl 87 which is engageable with a ratchet 88, which latter is secured to shaft 66. Pawl 87 is provided with an extending portion 87', and opposite this extension is a movable arm 86' carried by disk 86. When it is desired to operate the apparatus without connection between shaft 66 and the forking mechanism just described, the arm 86' is rotated to the dotted line position shown to engage the extension and hold pawl 87 in inoperative position.

Rotation of disk 86 obviously brings about initial reciprocal movement of block 82, within the limit noted. After its maximum movement with respect to block 81 is made, block 81 is made to move unitarily with it. Upon beginning of the return stroke block 82 is first moved as noted, causing initial pivotal movement of arms 77 to position them as shown in solid lines in Fig. 5. In this position the arms 77 are positioned to begin a forward stroke and are obviously adapted to engage the hay to co-operate with pins 60' and tines 69 to move the stream forward.

At the beginning of a return stroke the arms 77 are first rotated to the position shown in dotted lines so as to be returned without disturbance of the hay.

The function of the ratchet connection between shaft 66 and disk 86 is to produce rotation of the disk and consequent operation of arms 77 during rotation of shaft 66 in one direction, and to leave them inoperative during reverse rotation. The purpose of this reverse rotation will now be explained.

It is well known that in the operation of baling hay there are periods of time when the stream of hay being fed must be stopped and parted at the point of entry into the baler to permit insertion of separating blocks between the bales.

Under conditions of practical use the machine herein described is continuously moved over the field and the hay is substantially continuously picked up and projected into the machine. For this reason provision must be made for momentarily arresting and positively breaking the stream entering the baler without interruption of the normal gathering process.

To accomplish this we provide that movement of shaft 66 and chains 60 may at any time be reversed to move hay disposed in the cross feed conveyor in opposite direction.

Reverse movement of shaft 66 and chains 60 obviously results in reverse operation of the feeding mechanism. It has already been explained that the feeding mechanism is capable of forcibly conducting the hay stream to discharge it into the baler. It will be obvious then, that the mechanism when reversed will operate with equal efficiency in forcibly conducting the hay stream in reverse direction away from the baler.

Assuming the hay stream to be feeding into the baler, and the baler mechanism to be compressing it in the well known manner, there will substantially always be a portion of the stream lying between the force feeder and baler proper. When it is desired to insert a separating block in the baler it is of course necessary to part the hay stream completely so that the fibres, particularly at the bottom, will not connect between adjacent bales.

This will be clear when it is considered that the separating blocks are usually inserted from the top and the hay also enters at the top. If the hay stream is not completely broken, the block, as it descends, will merely push down any hay fibers present but will not break or separate them, and in this event a new bale will be built up with fibers of the old bale connecting and intermingling with those of the new, particularly as will be understood, under the lower edge of the block.

Considering that fibers or stems of plants usually baled have relatively high tensile strength, it will be apparent that any considerable number of them lying in parallel or twisted relation between the bales will form a connection which may make separation of the bales difficult. If the bales are forcibly pulled apart, one or both of the ends may be torn out, thus damaging the bale, or it will be necessary to add extra labor of cutting.

In machines of the present type heretofore available it has been found necessary to provide an extra operator whose duty it is to manually separate the hay stream when the cross feed conveyor is reversed and this extra labor obviously increases the cost of the work of baling.

With our force feeding and retracting mechanism, parting of the stream is automatically accomplished when the cross feed conveyor is reversed. Thus considerable labor is saved, more efficient operation of the machine as a whole is promoted and production of more perfect bales is assured.

It is to be noted that in parting the hay stream the baler mechanism compresses the hay stream in the baler proper and thus holds it while the feeder elements forcibly withdraw the fibers which are not engaged. In this manner the baler mechanism cooperates with the feeder mechanism in parting the hay stream to form cleanly separated bales.

It is apparent that reverse movement of shaft 66 would not result in corresponding reversal of the operating movements of arms 77 and for this reason the ratchet and pawl, 88—87, mechanism is provided, whereby operative movement of arms 77 take place only when normal feeding movement of the associated elements is in progress. The arms remain stationary during reverse movement.

Obviously reverse movement of the hay stream as described entails provision for accumulation of hay which is constantly being added by the pick-up, and to accomplish this we provide a novel arrangement, Fig. 7, comprising an end plate 89 which extends downwardly from the end of the cross feed structure as shown, and is curved to follow a circular line about the axis of shaft 62 and to extend tangentially a small distance parallel with the conveyor mechanism. Plate 89 is enclosed at each side by extensions of side boards 78 and 90.

The structure described provides a channel or corridor leading from the top side of the conveyor, around sprockets 61 into a lower portion adjacent the bottom side of the conveyor.

In practice the period of time required for changing blocks is relatively short and for this reason the period during which the conveyor is reversed is short.

When reversal is made the hay stream is conducted into the corridor with pins 60' firmly engaged, whereby the stream moves substantially in unison with the pins, around sprockets 61 into the lower portion of the corridor. The corridor is of sufficient length to accommodate the amount of hay involved during the normal block changing period.

When normal operation is resumed, movement of the hay present in the corridor is reversed and the hay is withdrawn to be conducted to the baler in the usual manner.

It will be noted that, during reverse operation of the cross feed conveyor, the gathered hay may be continuously fed thereto without interruption. Thus all gathering and feeding functions are accomplished in a smooth, orderly manner without destructive agitation of hay fibers.

In order to properly control the several elements as noted, we provide a novel control unit 48 supported on the baler frame as indicated in Fig. 5.

Conventional baler mechanisms are thought sufficiently well known to obviate description further than to say that in the present disclosure, we show the usual gear train including a pinion 91 driven through a power take-off connection, 92, with the mechanism of tractor 14. The mechanism may obviously be driven by power means other than that provided through the tractor engine.

Pinion 91 operates through gear and pinion 93 and gear 94 to drive a pinion 95 of the control unit.

It will be noted that the control unit has a projecting shaft 96 carrying a sprocket 47 which has driving connection with the pick-up unit as already noted.

Another shaft, 97, projects from the side of the unit and has connection through a break down clutch 98 and shaft 99 with a sprocket 100. Shaft 99 is journaled in a bracket secured to the cross feed frame structure as shown in Fig. 7.

Sprocket 100 has driving connection, through chain 101, with a sprocket secured to shaft 63 and a sprocket 102 secured to shaft 66. It will be clear that power supplied by shaft 96 drives the pick-up unit, and that supplied by shaft 97 drives the cross feed unit.

Figure 3:
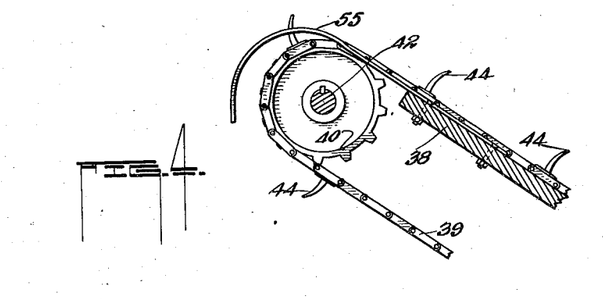
Fig. 3 is a perspective view of the device as seen from the side opposite that shown in Fig. 1.

Before proceeding with a description of details of the control unit it is to be noted that it is arranged to be controlled by means of a hand bar 103, Fig. 3, disposed convenient to an operator standing on a platform 104 of the baler. It is further to be noted that in the following description, movements of the elements of the control unit are described as they appear in the drawings. In actual use all elements of the control unit move in a horizontal plane.

Fig. 5 indicates that bar 103 is connected, through a shaft 105 with an arm 106 disposed on the opposite side of the baler and having connection with a sliding element 107 of the control unit 48 through a rod 108. Thus it is provided that the control unit may be conveniently operated from the operator's platform.

Figures 14, 15, 16:
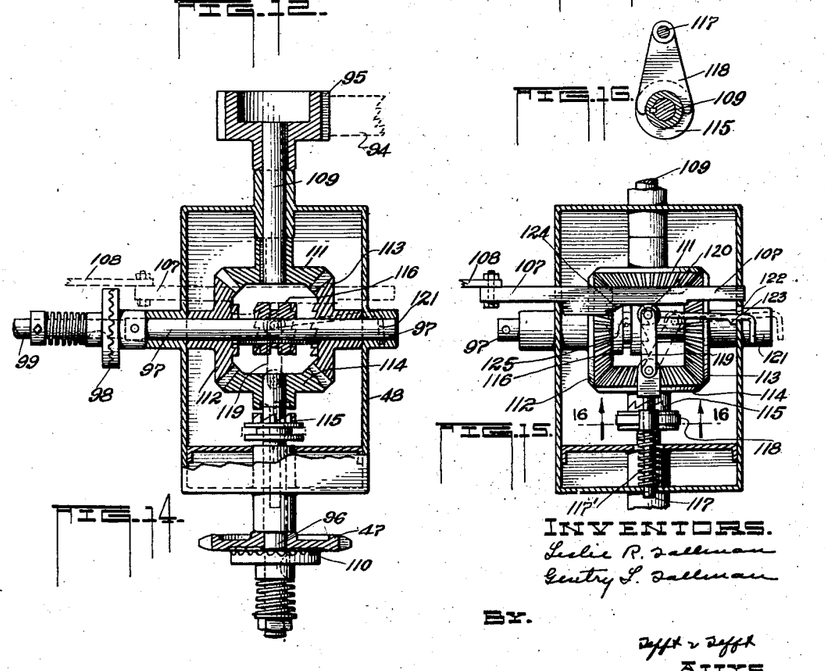
Fig. 14 is a horizontal sectional view through a control mechanism embodied in the invention.
Fig. 15 is a view similar to Fig. 14 showing details of additional mechanism and Fig. 16 is a sectional detail view taken on line 16—16 in Fig. 15.

Figs. 14 and 15 disclose the unit as comprising a housing in which is journaled a shaft 109 carrying pinion 95, already noted, shaft 97 extending across the housing and shaft 96 carrying sprocket 47, the connection between the latter shaft and sprocket being through a break-down clutch 110.

Keyed to shaft 109 is a mitre gear 111 which meshes with oppositely disposed mitres 112 and 113, rotatably mounted on shaft 97, which in turn are meshed with a mitre gear 114.

A clutch member 115 is slidably keyed to shaft 96 and is engageable with teeth formed in the hub of gear 114 to bring about unitary rotation of the shaft with the gear.

The teeth of clutch 115 are so fashioned as to be operable as a connection in one direction of rotation only.

A second clutch member 116 is disposed between gears 112 and 113 and is slidably keyed to shaft 97. This second clutch member is slidable on shaft 97 to be engageable with teeth formed on the inner faces of gears 112 and 113 whereby the shaft may selectively be caused to rotate unitarily with either of the gears.

As already noted, the gear train described is driven through pinion 95 and the gears are obviously in constant rotation during operation of the baler mechanism. Gears 112 and 113 revolve in opposite direction while gear 114 revolves in direction opposite that of gear 111.

It will be apparent that by moving clutch 115 into or out of engagement with gear 114, operation of the pick-up unit may be started or stopped. Also, by moving clutch 116 into engagement with a selected one of gears 112 and 113 the cross feed unit may be driven in forward or reverse direction. In the present disclosure it is assumed that gear 112 drives the cross feed unit in forward direction and gear 113 in reverse.

Fig. 15 illustrates mechanism for operating clutch 115, consisting of a stem 117 slidably mounted in the housing and carrying a fork 118, Fig. 16, which engages in an annular groove of clutch member 115, whereby longitudinal movement of the stem brings about operative movement of the clutch. The stem and fork are urged upwardly by a spring 117'. Pivotally attached to the upper end of the stem is a link 119 in the opposite end of which is mounted a roller 120. An operating bar, 121 is pivotally attached adjacent the roller and extends through the housing to terminate in an angulated portion to facilitate manipulation. The bar passes through a slot 122 in the housing and has a tooth portion 123 so disposed that when the mechanism is in position shown in solid lines the tooth is engaged with the inner wall of the housing to retain link 119 in vertical position whereas when bar 121 is raised in slot 122 it may be moved outwardly to offset the link as shown in dotted lines.

Roller 120 is urged by spring 117' into contact with a cammed portion 124 of the sliding bar 107. It will be apparent that with the sliding bar positioned as shown, clutch 115 is retained in engagement and bar 107 may be moved toward the left without alteration of this relationship whereas, when the bar is moved toward the right, cam 124 forces roller 120, abutted by tooth 123 of bar 121, downwardly to disengage clutch 115. In case bar 121 and link 119 are in dotted line position, bar 107 may obviously be freely moved to right or left without disengagement of clutch 115.

Secured to the rear side of bar 107, shown broken away in Fig. 15, is a fork similar to fork 118 which is disposed in the annular slot of clutch 116. By means of this fork connection the clutch member is caused to move laterally on shaft 97 in unison with bar 107. With roller 120 disposed as shown in Fig. 15, the cam portion 124 of bar 107 is so disposed with respect to the roller and clutch 16, that when the bar rests in position at the left, as in Fig. 15, to engage the forward drive of the cross feed unit, the clutch 118 is engaged.

When bar 107 is moved toward the right a sufficient distance to disengage clutch 116, cam 124 moves under roller 120 to force the same downwardly and disengage clutch 115. Thus, whenever the control is moved to stop forward drive of the cross feed conveyor, the pick-up conveyor is automatically stopped. Obviously, bar 107 may be moved toward the right far enough to engage the reverse gear 113 without affecting the disengaged relationship of clutch 115.

With link 119 and bar 121 in dotted line position, Fig. 15, wherein roller 120 is not in the path of cam 12, the pick-up conveyor remains in operation while bar 107 may be shifted to left or right to drive the cross feed conveyor forward or reverse.

Practical operation of our combine may be summarized as follows:

With the pick-up unit elevated by means of the hand wheel 36 mechanism, the combine may be transported to the field. Upon arrival there the hand wheel mechanism is released to lower the ground wheels 22 to the ground and the tension spring 28 is adjusted, as described, to regulate the amount of weight resting upon the ground wheels, this being in accordance with the contour of the surface of the field and consistency of the soil, or other conditions to be encountered.

At this time the bar 121 of the control unit is moved out to render fork 118 inoperative, after which the operator on platform 104 moves hand bar 103 from neutral position to engage clutch 116 with gear 112.

The combine is then ready to begin progress in the field. The power take-off or engine is placed in operation to drive the baler unit and pick-up and cross feed conveyors, as described, to pick up and transport hay to the baler.

When sufficient hay has accumulated in the baler the operator on platform 104 moves hand bar 103 to reverse the cross feed conveyor to break the hay stream while he places a separating block, after which he moves the bar 103 back to its former position to cause the cross feed to resume normal operation. It will be noted that all operative functions are easily and simply controlled by a single operator with a single lever.

The usefulness of our device is not confined to pick-up baling in the field. In many cases it is desired to utilize the mechanism for stationary baling of hay or straw which has been stacked or stored, and in such cases the hay may be placed directly upon the pick-up conveyor, which may or may not be elevated by means of hand wheel 36 as desired.

Operation for the latter use is substantially similar to that already described with the exception that since the amount of hay being delivered is under direct control of those delivering it, it is not always necessary to reverse the cross feed conveyor when it is desired to stop the feed to the baler. In practice it is sufficient to stop it while the block is being inserted. Under conditions of practical use it is desirable to start and stop both the pick-up and cross feed conveyors simultaneously.

When such operation is intended, the bar 121 is set in, as shown in solid lines in Fig. 15, to render roller 120 effective to operate clutch 115 whereby, when the cross feed conveyor is also in operation but both conveyors are stopped when the control is operated to stop the cross feed as noted.

By further movement of bar 107 the cross feed conveyor may be operated in reverse, but reverse movement of the cross feed conveyor cannot be effected without automatically stopping the pick-up conveyor. The one-way drive feature of clutch 115, already noted, forms an additional safeguard against possible back-up movement of the pick up conveyor.

The foregoing is thought to clearly describe the structure and functions of our invention. Modifications of the structure are possible without alteration of principle.

We do not wish to be limited in structure or function except within the scope of the appended claims.

What we claim is:

1. A device of the class described having in combination a pick-up conveyor and a cross feed conveyor mechanism having one end disposed to discharge into a baler, a reservoir at its opposite end and means to operate the cross feed conveyor elements in opposite directions whereby hay placed upon the cross feed may be transported optionally into the baler or in the opposite direction into said reservoir.

2. A device of the class described having in combination, a pick-up conveyor and a cross feed conveyor mechanism having one end disposed to discharge into a baler, a reservoir at its opposite end and means to operate the latter conveyor elements in opposite directions whereby hay placed upon said latter conveyor may be transported optionally into the baler, in the opposite direction into said reservoir or in original direction to withdraw hay from the reservoir and feed the same into the baler.

3. A feeding mechanism for a baler comprising a pick-up mechanism including a conveyor, a second conveyor associated therewith having one end disposed so as to discharge into the baler and a reservoir disposed at its opposite end, means to drive the second conveyor in opposite directions, said pick-up mechanism adapted to gather hay from the ground and discharge the same into the second conveyor which is capable of transporting the hay into the baler or into said reservoir in accordance with its direction of travel.

4. A feeding mechanism for a baler comprising a pick-up mechanism including a conveyor, a second conveyor associated therewith having one end disposed so as to discharge into the baler, and a reservoir disposed beneath its opposite end, means to drive the conveyor in opposite directions, said pick-up mechanism adapted to gather hay from the ground and discharge the same into the second conveyor which is capable of transporting the hay into the baler or into said reservoir and out of said reservoir and into the baler in accordance with its direction of travel.

5. In a device of the class described the combination of a pick-up mechanism including a conveyor, a second conveyor mechanism co-operative therewith, said pick-up mechanism adapted to gather hay from the ground and discharge the same to the second conveyor in a substantially continuous stream, said second conveyor having one end disposed to discharge the hay to the baler, a restricted passage between the conveyor and baler and a forking mechanism operating in said passage capable of forcing the hay through the passage to compress the same for more efficient insertion into the baler.

6. A pick-up and feeding device comprising a pick-up mechanism including a conveyor, a second conveyor mechanism associated therewith, said pick-up mechanism adapted to continuously gather hay from the ground and discharge the same to the second named conveyor in a substantially continuous stream, said second conveyor having one end disposed to discharge hay to the baler and at this end a constricted passage through which the hay stream passes, a forking mechanism operating in said passage capable of forcing the hay therethrough to compress the same, means operating to drive the conveyor in forward direction to transport hay toward said passage or in reverse direction to transport the hay away from the passage, a reservoir disposed at the opposite end of the conveyor adapted to receive hay transported away from the passage to hold the same during reverse operation of the conveyor in position to be re-transported toward the passage upon resumption of forward operation of the conveyor.

7. A feeding mechanism for a baler comprising a pick-up mechanism including a conveyor, a second conveyor associated therewith having one end disposed so as to discharge into the baler and at this end a constricted passage, means to drive the second conveyor in forward or reverse direction toward or away from the baler, said pick-up mechanism adapted to gather hay from the ground and discharge the same to the second conveyor in a substantially continuous stream, said second conveyor adapted to transport the hay toward or away from said passage and baler, a forking mechanism in the passage, driving connection between the forking mechanism and conveyor drive elements to operate the forking mechanism co-operatively with the conveyor whereby the hay stream is forcibly driven through the passage in compressed form to the baler or, upon reversal of the conveyor, backwardly through the passage and away from the baler whereby to forcibly break the continuity of the stream flowing into the baler.

8. A feeding device for balers including a pick-up mechanism and conveyor adapted to take hay from the ground and elevate the same, a second conveyor mechanism adapted to receive the hay and transport the same toward or away from the baler, said second conveyor mechanism comprising a conveyor upon which the hay rests and is transported and a forking mechanism disposed at one side of the conveyor adapted to engage the upper portion of the hay riding upon the conveyor and urge the same in the direction of conveyor movement whereby to assist the conveyor in transporting the hay and means to operate the conveyors and said forking mechanism in a co-operative manner.

9. A device of the class described including in combination a cross-feed conveyor mechanism having one end disposed to discharge into a baler and means at its opposite end for receiving hay transported by the conveyor, means to operate the cross-feed conveyor in opposite directions whereby hay placed upon the cross-feed conveyor may be transported optionally into the baler or in the opposite direction into said receiving means, and means to transport hay to said cross feed conveyor.

10. A device of the class described including in combination a cross-feed conveyor mechanism having one end disposed to discharge into a baler and means at its opposite end for receiving hay transported by the conveyor, means to operate the latter conveyor in opposite directions whereby hay placed upon said latter conveyor may be transported optionally into the baler, in the opposite direction into said receiving means or in original direction to withdraw hay from the receiving means and feed same into the baler, and means to transport hay to the cross feed conveyor.

11. A feeding mechanism for a baler comprising a pick-up mechanism including a conveyor, a second conveyor associated therewith having one end disposed so as to discharge into the baler and receiving means disposed at its opposite end, means to drive the second conveyor in opposite directions, said pick-up mechanism adapted to gather hay from the ground and discharge the same into the second conveyor which is capable of transporting the hay into the baler or into said receiving means in accordance with its direction of travel.

12. A feeding mechanism for a baler comprising a pick-up mechanism including a conveyor, a second conveyor associated therewith having one end disposed so as to discharge into the baler, and a receiving means disposed beneath its opposite end, means to drive the conveyor in opposite directions, said pick-up mechanism adapted to gather hay from the ground and discharge the same into the second conveyor which is capable of transporting the hay into the baler or into said receiving means and out of said receiving means and into the baler in accordance with its direction of travel.

13. A pick-up and feed device for balers comprising a pick-up mechanism including a conveyor, a second conveyor mechanism associated therewith, said pick-up mechanism adapted to continuously gather hay from the ground and discharge the same to the second named conveyor in a substantially continuous stream, said second conveyor having one end disposed to discharge hay to the baler and at this end a constricted passage through which the hay stream passes, a forking mechanism operating in said passage capable of forcing the hay therethrough to compress the same, means operating to drive the conveyor in forward direction to transport hay toward said passage or in reverse direction to transport the hay away from the passage, a receiving means disposed at the opposite end of the said second conveyor adapted to receive hay transported away from the passage, to hold the same during reverse operation of the conveyor in position to be re-transported toward the passage upon resumption of forward operation of the conveyor.

14. A device of the class described including in combination a cross feed conveyor mechanism having one end disposed to discharge into a baler and means at its opposite end for receiving hay transported by the conveyor, means to operate the cross feed conveyor in opposite directions whereby hay placed upon the cross feed conveyor may be transported optionally into the baler or in the opposite direction into said receiving means, means to transport hay to the cross feed conveyor and a readily accessible handle disposed adjacent the baler for controlling operation of the cross feed conveyor.

15. A feeding device for balers comprising a pick-up mechanism and conveyor adapted to take hay from the ground and elevate the same, a second conveyor mechanism disposed transversely of the first-mentioned conveyor having one end disposed to discharge into the baler, means to selectively drive the second conveyor in reverse directions to transport hay toward or away from the baler and manual means controlling said drive means.

16. In a pick-up mechanism for a baler, a conveyor mechanism having means to continuously gather hay from the ground, a second conveyor mechanism in receptive relation to the hay continuously picked up by the first-named conveyor, said second-named conveyor having one end thereof in feeding relation to the baler, a mechanism associated with the said end of the second-named conveyor to contract the hay stream and assist the second-named conveyor in discharging hay into the baler, a reservoir at the opposite end of the second-named conveyor in receptive relation to hay therefrom, and a reversing mechanism for the second-named conveyor whereby the hay stream may be selectively directed toward the baler or conducted away from the baler into the reservoir and subsequently withdrawn from the reservoir by the second-named conveyor mechanism and directed toward the baler.

17. In a structure of the class described for use in connection with a baler mechanism which compresses and confines hay, a pick-up conveyor having means to continuously pick up hay from the ground, a transfer conveyor in receptive relation to a continuous stream of hay from said pick-up conveyor and having a constricted passage for hay in feeding relation to said baler, means selectively driving said transfer conveyor in opposite directions to transport the hay stream toward or away from said passage and baler, a forking mechanism in said passage, driving means operating the forking mechanism cooperatively with said transfer conveyor to conduct the hay through the passage in a compacted form to the baler, or upon reversal of the transfer conveyor backwardly through the passage and away from the baler, there being means operating during the said backward movement of the hay from the passage causing a portion of the hay to be held in the baler while the forking mechanism retracts that part of hay not in the baler thereby forcibly and completely breaking the stream.

18. In a structure of the class described for use in connection with a baler mechanism which compresses and confines hay, a pick-up conveyor having means to continuously pick up hay from the ground, a transfer conveyor in receptive relation to a continuous stream of hay from said pick-up conveyor and having a constricted passage for hay in feeding relation to said baler, said transfer conveyor being selectively driven in opposite directions to transport the hay stream toward or away from said passage and baler, a forking mechanism in said passage, driving means operating the forking mechanism cooperatively with said transfer conveyor to conduct the hay through the passage in a compacted form to the baler, or upon reversal of the transfer conveyor backwardly through the passage and away from the baler, there being means operating during the said backward movement of the hay from the passage causing a portion of the hay to be held in the baler while the forking mechanism retracts that part of hay not in the baler thereby forcibly and completely breaking the stream, and a common source of power simultaneously operating said baler mechanism, the pick-up conveyor, the transfer conveyor and said forking mechanism.

19. In a structure for feeding a baler, a pick-up conveyor having means to pick up hay, a second conveyor in receptive relation to hay from the first-named conveyor and having one end in feeding relation to the baler, means selectively driving said second-named conveyor either toward the baler or away from the baler, said second-named conveyor being provided with an endless member having upper and lower flights and a plurality of spikes, a wall partially surrounding one end of the second-named conveyor in spaced relation thereto and extending below the lower flight of the second conveyor in spaced parallel relation thereto to cooperate therewith in the formation of a passage for hay with the lower flight of the second conveyor forming the top side of said passage, said spikes being positioned for propelling engagement with the hay on the upper flight of the second conveyor to move the hay toward the baler or away from the baler and being in propelling engagement with the hay in said passage to move the hay out of the passage and toward the baler.

20. In a feeding apparatus for a baler, a conveyor having one end portion thereof in feeding relation to the baler, said conveyor embodying an endless member having upper and lower flights, means selectively driving said conveyor so that the upper flight thereof is moved either toward the baler or away from the baler, a wall partially surrounding one end of the conveyor in spaced relation thereto and extending in spaced relation to the lower flights of the endless member to cooperate therewith in the formation of a passage extending from the upper to the lower flights of the conveyor, said passage being in receptive relation to hay on the upper flight of the conveyor when such upper flight is driven toward the passage, said lower flight being in propelling relation to the hay in the passage so that when the conveyor is driven in the other direction the hay is conducted out of said passage and toward the baler.

LESLIE R. TALLMAN.
GENTRY L. TALLMAN.